June 25, 1957  G. A. McNEELY  2,797,007
BOAT LOADING AND CARRYING RACKS FOR AUTOMOBILES
Filed Nov. 17, 1954  3 Sheets-Sheet 1
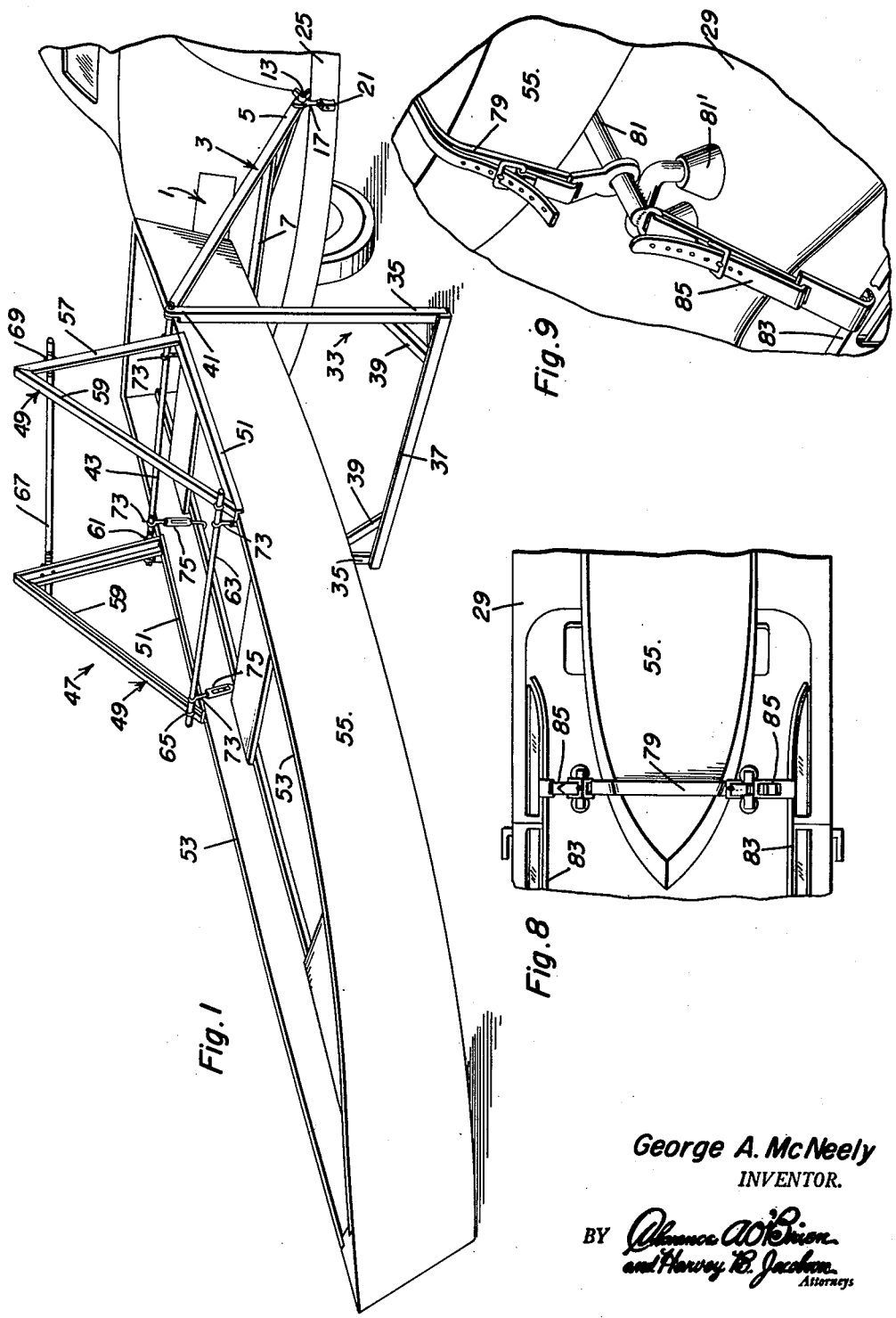
George A. McNeely
INVENTOR.

June 25, 1957  G. A. McNEELY  2,797,007
BOAT LOADING AND CARRYING RACKS FOR AUTOMOBILES
Filed Nov. 17, 1954  3 Sheets-Sheet 2
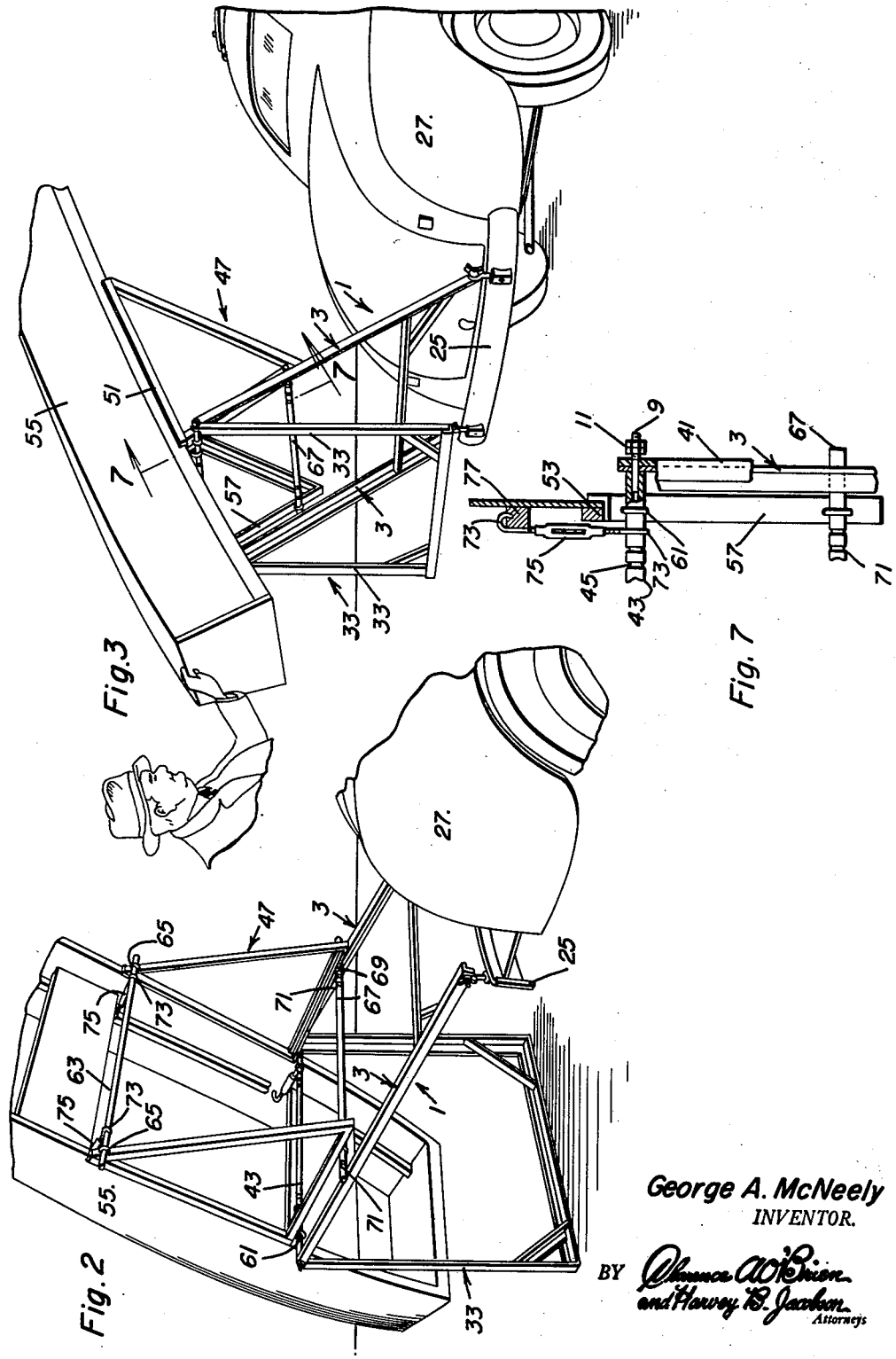
George A. McNeely
INVENTOR.

June 25, 1957   G. A. McNEELY   2,797,007
BOAT LOADING AND CARRYING RACKS FOR AUTOMOBILES
Filed Nov. 17, 1954   3 Sheets-Sheet 3
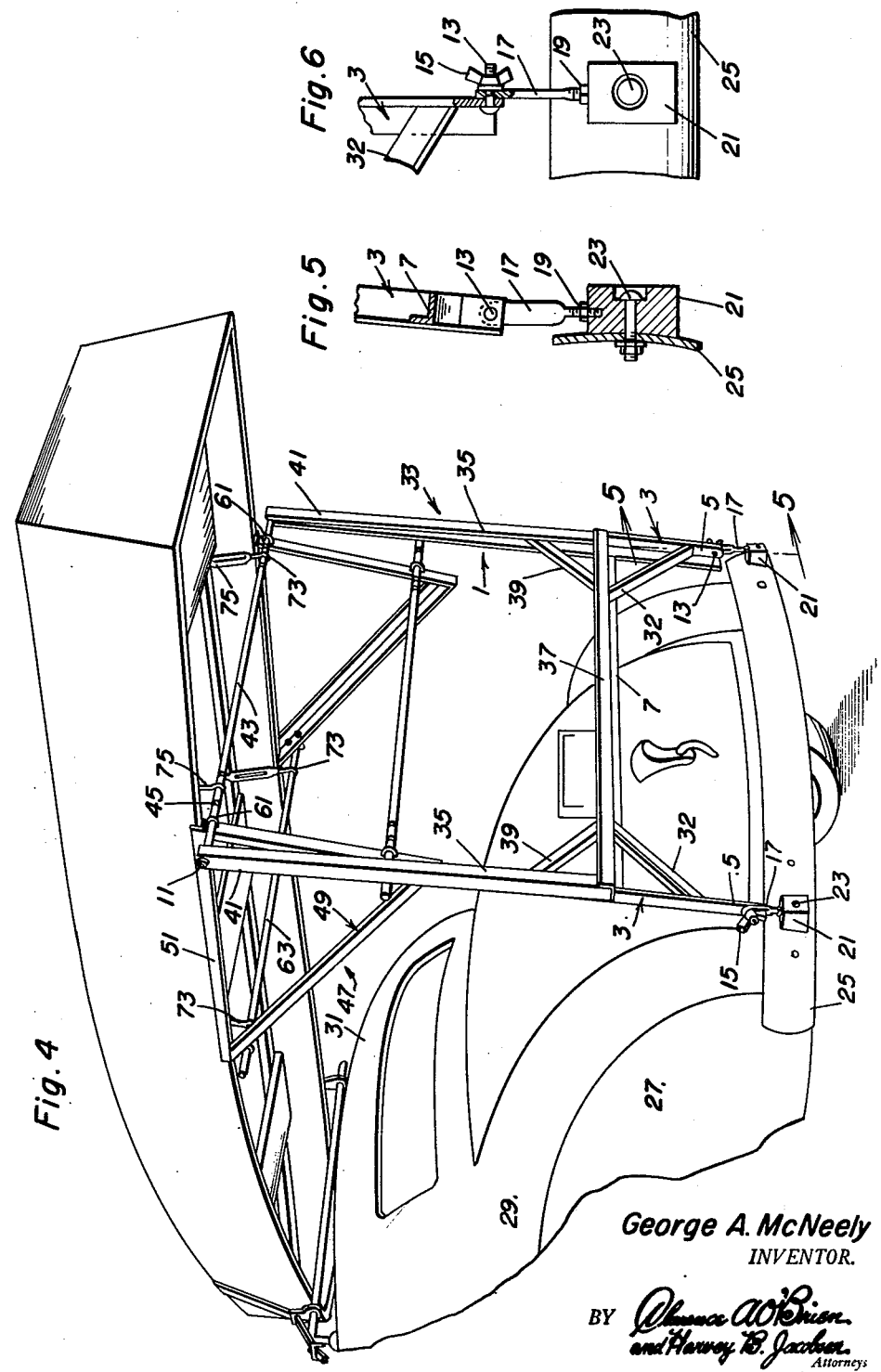
George A. McNeely
INVENTOR.

United States Patent Office 2,797,007
Patented June 25, 1957

2,797,007

BOAT LOADING AND CARRYING RACKS FOR AUTOMOBILES

George A. McNeely, McGehee, Ark., assignor of one-half to George E. McNeely, McGehee, Ark.

Application November 17, 1954, Serial No. 469,447

2 Claims. (Cl. 214—450)

My invention relates to improvements in racks for loading and carrying a small boat on a hard top sedan type automobile.

The primary object of my invention is to provide a boat loading and carrying rack which will enable one man to swing a boat up over an automoblie top with a minimum of effort and whereby the boat may be carried with safety when the automobile is travelling over rough roads.

Another object is to provide in such a rack a lifting frame pivotally attachable easily and quickly to the rear bumper of an automobile for swinging upwardly and forwardly from a lowered position to swing a boat up over an automobile into loaded position and having a boat supporting cradle thereon attachable to the gunwales of boats of different widths and swingable on the lifting frame from a boat attaching position to invert the boat into an overlying fixed position relative to the lifting frame and in which swinging of the boat up over the automobile is greatly facilitated.

Still another object is to provide a rack of the type and for the purpose above set forth which is of simple, strong construction and adapted for inexpensive manufacture.

Other and subordinate objects together with the precise nature of my improvements will become apparent when the following description and appended claims are read with reference to the drawings accompanying and forming part of this specification.

In said drawings:

Figure 1 is a fragmentary view in perspective illustrating the lifting frame attached to the rear bumper and in lowered position and the boat supporting cradle in boat attaching position;

Figure 2 is a fragmentary perspective view illustrating the boat supporting cradle swung on the lifting frame to invert the boat into overlying position;

Figure 3 is a fragmentary perspective view illustrating the manner in which the lifting frame is swung upwardly and forwardly;

Figure 4 is an enlarged fragmentary perspective view of the rack swung upwardly and forwardly to swing the boat into loaded position;

Figure 5 is an enlarged fragmentary view in vertical section of the means for pivotally attaching the rack to the rear bumper the section being taken on the line 5—5 of Figure 4.

Figure 6 a fragmentary view in rear elevation partly in section of the same;

Figure 7 is an enlarged fragmentary view in vertical section taken on the line 7—7 of Figure 3;

Figure 8 is a fragmentary view in plan of the boat and automobile top and means for attaching the boat in loaded position to said top; and Figure 9 is a fragmentary enlarged view in perspective of the same.

Referring to the drawings by numerals, according to my invention a rectangular lifting frame designated generally by the numeral 1 is provided comprising a pair of parallel angle iron side bars 3 having pivoted ends 5, a cross connecting angle iron bar 7 adjacent said pivoted ends 5 and a rod 9 with end nuts 11 therein cross connecting the other free ends of said bars 3.

Pivot bolts 13 traversing said pivoted ends 5 and having wing nuts 15 therein detachably connecting said bars 3 by the ends 5 to a pair of upright bars 17 threaded, with lock nuts 19 therein, into a pair of blocks 21 bolted, as at 23, to the rear side of the rear bumper 25 of the automobile 27 adjacent opposite ends of said bumper 25, said bolts 13, upright bars 17, blocks 21 and bolts 23 forming means easily attachable to and detachable from said bumper 25 and mounting the lifting frame 1 on said bumper 25 for swinging downwardly to extend rearwardly from said bumper 25 or upwardly and forwardly in the rear of the body 29 of the automobile 27 into vertical position in which the rod 9 is slightly above the top 31 of the body 29. Diagonal brace bars 32 connect the side bars 3 to the bar 7.

A U-shaped jacking frame 33 with a pair of angle iron side bars 35 cross connected by a bottom angle bar 37 is provided for the lifting frame 1. The jacking frame 33 is braced by diagonal lower corner bars 39 and is pivotally mounted on the lifting frame 1 by means of the rod 9 which extends through the free ends 41 of the side bars 35. As will be seen the jacking frame 33 straddles the lifting frame 1 and is swingable about a horizontal axis thereon.

A tubular rotary sleeve 43 is provided on the rod 9 and extends between the side bars 3, said sleeve being provided with longitudinally spaced circumferential grooves 45 for a purpose presently explained.

The boat supporting cradle 47 comprised of a pair of angle iron side frames 49 of right angle triangle form having boat attaching base sides 51 channeled to fit over and extend along the gunwales 53 of a boat 55, a side 57 perpendicular to said side 51, and an oblique side 59. U-bolts 61 on the perpendicular sides 57 adjacent the base side 51 are adapted to be clampingly engaged with selected grooves 45 in the before-mentioned sleeve 43 to space said frames 49 apart laterally to fit over and be attached to gunwales 53 of boats of different widths. A cross connecting rod 63 extends across the oblique sides 49 adjacent the angle formed thereby with the base sides, and is clamped to said sides 49 by U-bolts 65. A transverse cross connecting rod 67 extends across the perpendicular sides 57 adjacent the angle formed by said sides 57 with the oblique sides 59 and is clamped to said sides 57 by U-bolts 69. The rod 67 is provided with longitudinally spaced circumferential grooves 71 for selective engagement by the U-bolts 69 when adjusting the frames 49 laterally. As will be understood the U-bolts 65 provide for lateral adjustment of the frames 49 along rod 63. The rod 67 extends outwardly of the frames 49 and serves as a stop in a manner and for a purpose presently seen.

The boat 55 is attached to the frames 49 of the cradle 47 by means of pairs of opposite hooks 73 connected in pairs by turnbuckles 75, the hooks 73 being engaged with the sleeve 43 and rod 63 and internal longitudinal side ribs 77 in the boat, said pairs of hooks 73 and turnbuckles 75 forming clamps clampingly seating the base sides 51 of the frames 49 on the gunwales 53 in straddling relation thereto.

Referring now to the operation of the invention, preparatory to loading a boat 55, the lifting frame 1 is swung downwardly to extend rearwardly from the bumper 25 and automobile 27 and the jacking frame 33 swings on the rod 9 under the influence of gravity to engage the ground in upright position to support said lifting frame 1 all as shown in Figure 1. The boat 55 is shoved stern foremost into the jacking frame 33. The cradle 47 is swung vertically on the transverse rod 9 of the lifting frame into rearwardly extending position relative to said frame 1 with its base sides 51 lowermost and the boat 55 is lifted and attached to said cradle 47 in the manner already described with the cradle 47 adjacent the stern of said boat as illustrated in Figure 1.

After the boat 55 is attached to the cradle 47 it is lifted manually by its prow end and swung upwardly and forwardly into inverted position to correspondingly swing the cradle 47 into inverted position in which it overlies the lifting frame 1 this position being established by engagement of the ends of the rod 67 with the top of the side bars 3 whereby said rod 67 acts in the capacity of a stop limiting swinging of the cradle 47 and boat 55 into inverted position all as shown in Figure 2. As will be seen in the described inverted position of the boat 55 and cradle 47 the boat and cradle 47 are overbalanced on the rod 9 with the cradle 47 overlying the lifting frame 1, and the major portion of the boat 55 inclined upwardly and forwardly over the lifting frame 1 so that the major part of the weight of the boat 55 is over the frame 1, as is shown in Figure 2. As will further be seen the boat 55 is inclined at a right angle to the lifting frame 1.

After the boat 55 and cradle 47 are inverted as described in the foregoing the boat 55 is pushed manually, as shown in Figure 3, forwardly thereby causing the lifting frame to swing on the pivot bolts 13 upwardly and forwardly to lift the boat 55 correspondingly until its prow portion overlies the vehicle 29 and when the lifting frame 1 is substantially perpendicular to the bumper 25 the boat 55 will be substantially horizontal as shown in Figure 3. In this position of the boat 55 and lifting frame 1 the jacking frame 33 will hang pendant from the rod 9 also as shown in Figure 3 and the prow end of the boat 55 may be secured to the top 29 for instance by straps 79 securing it on the conventional luggage rack bar 81 on said top 29 secured to said top 29 by suction cups 81' and to the side gutters 83 of the top 29 by strap fasteners 85.

The manner in which the boat 55 may be unloaded will be obvious from the foregoing and also the manner in which the rack may be detached for storage purposes.

The foregoing will, it is believed suffice to impart a clear understanding of my invention.

Manifestly the invention is susceptible of modification without departing from the inventive concept and right is herein reserved to such as fall within the scope of the appended claims.

What is claimed as new is as follows:

1. A boat loading and carrying rack comprising a rectangular lifting frame, means attachable to the rear bumper of an automobile and pivotally mounting said lifting frame for vertical swinging in opposite directions to extend rearwardly of said bumper and perpendicular thereto respectively, a transverse sleeve on the other end of said frame, a jacking frame pivoted to said sleeve on the other end of said lifting frame for supporting the lifting frame in rearwardly extending position, a boat supporting cradle pivoted on said sleeve on said other end of the lifting frame, means attached to said cradle and attachable to the gunwales of a boat to attach said cradle to said boat for supporting the same, said cradle being swingable vertically into rearwardly extending position with respect to the lowered lifting frame for attachment to said boat and swingable vertically into overlying position with respect to said lifting frame to invert said boat and swing the same over the lowered frame at a right angle position relative thereto whereby when the lifting frame is swung perpendicular to a rear bumper the boat will overly a top of an automobile, said cradle comprising right angled boat supporting side frames, a cross rod secured to both of said right angled boat supporting frames and being longer than the distance across the sides of said lifting frame so that the ends of said cross rod engageable with the sides of said lifting frame to limit swinging of the cradle in overlying position and establish said right angled position of the boat, and adjustable hooks carried by said sleeve for attaching the boat to said cradle.

2. The combination of claim 1 and an additional cross rod secured to said right angled boat supporting frames, said additional cross rod being spaced from said sleeve and first mentioned cross rod, and adjustable hooks carried by said additional cross rod for fastening to the boat.

References Cited in the file of this patent
UNITED STATES PATENTS
2,584,163   Squires _____ Feb. 5, 1952